United States Patent [19]
Kraemer

[11]  3,744,925
[45]  July 10, 1973

[54] APPARATUS FOR REGULATING A TURBO-COMPRESSOR

[75] Inventor: Wendelin Kraemer, Frankfurt, Germany

[73] Assignee: Aktiengesellschaft Brown, Boveri & Cie, Baden, Switzerland

[22] Filed: June 15, 1971

[21] Appl. No.: 153,229

[30] Foreign Application Priority Data
June 23, 1970  Switzerland.......................... 9455/70

[52] U.S. Cl. .................................................. 415/17
[51] Int. Cl. ............................................ F01b 25/00
[58] Field of Search ...................................... 415/17

[56] References Cited
UNITED STATES PATENTS

| | | | |
|---|---|---|---|
| 3,332,605 | 7/1957 | Huesgen ................................. | 415/17 |
| 2,478,423 | 8/1949 | Ponomareff ........................... | 415/17 |
| 3,073,511 | 1/1963 | Knight et al. ......................... | 415/17 |
| 3,083,892 | 4/1963 | Carey et al. .......................... | 415/17 |
| 3,245,219 | 4/1966 | Warden et al. ....................... | 415/17 |

Primary Examiner—C. J. Husar
Attorney—Pierce, Scheffler & Parker

[57] ABSTRACT

A motor-driven turbo-compressor is provided with a first regulator in the form of a device for adjusting the diffusor blades for varying the rate of air flow through the compressor in accordance with variation in the compressor delivery demand, this being sensed in the form of a variation in output air pressure at the delivery side of the compressor and which produces a first signal which actuates the diffusor blade adjusting device. An anti-surging regulator controlled jointly by the air throughput rate and the output air pressure is also provided and produces a corresponding second signal. This second signal is combined with the first signal in a decoupling relay to produce a third signal which serves to actuate a blow-off valve located in the blow-off duct connected to the delivery duct of the compressor. The decoupling relay is also provided with an arrangement by which the first signal admitted to it is cancelled with an adjustable time delay so that it does not participate in forming the third signal when the regulating system is operating in a steady state mode.

3 Claims, 1 Drawing Figure

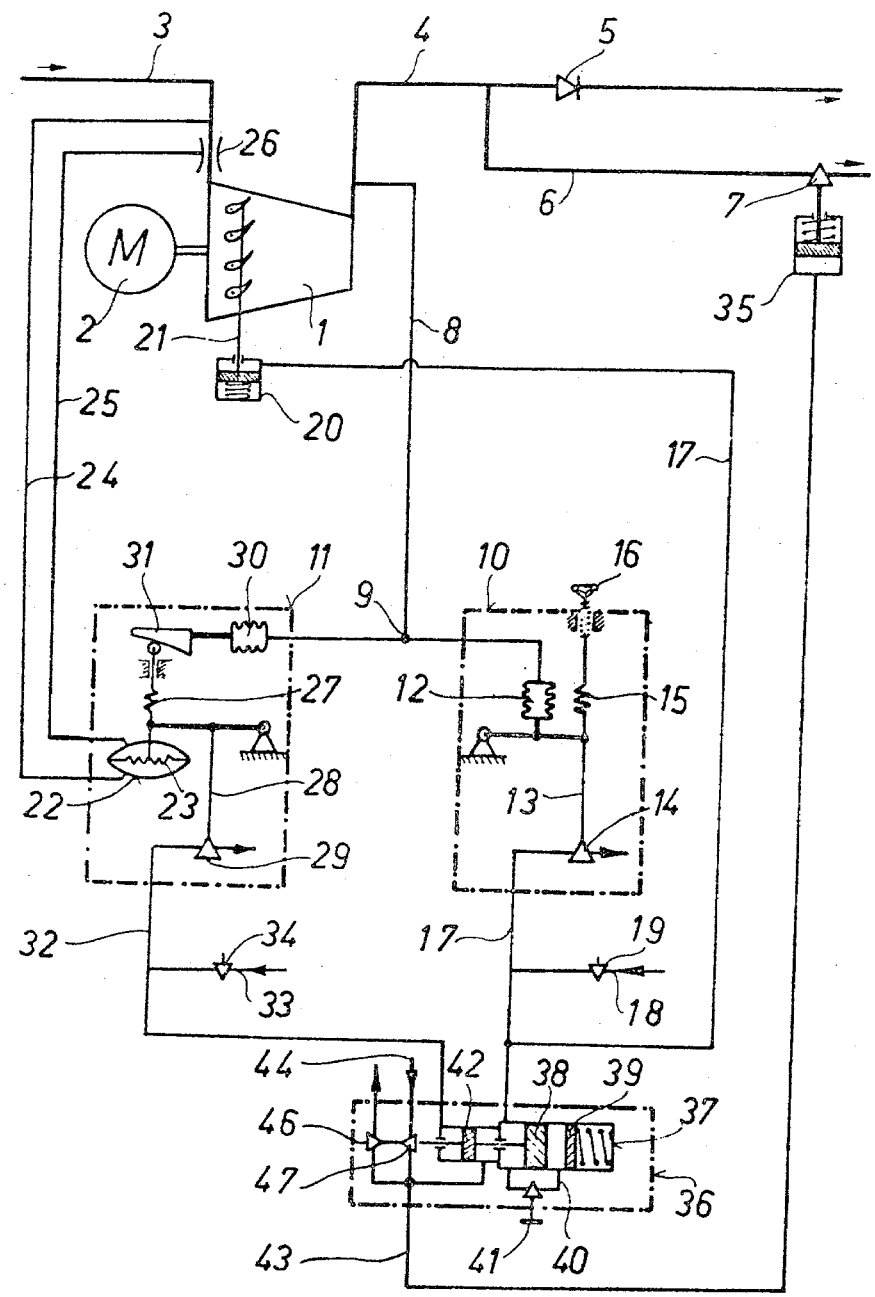

APPARATUS FOR REGULATING A TURBO-COMPRESSOR

This invention relates to apparatus for regulating a turbo compressor, with at least one anti-surging regulator and at least one delivery regulator or one discharge rate regulator which act on a blow-off valve or on apparatus for varying the discharge rate.

Regulating systems of turbo compressors are frequently required to ensure a constant output pressure for the compressed gas, irrespective of the consumption. A suitable control loop may comprise a duct, connected to the delivery duct, for measuring the output pressure or some other characteristic pressure, a pressure regulator, the output signal of which acts on a servomotor which in turn actuates apparatus for varying the discharge rate, such apparatus being adapted for adjusting the blades, a suction flap, "pilot rotation" or rotational speed or the like. Any change of consumption in the process initially alters the output pressure. The regulating system reacts to such a change primarily by altering the discharge rate which then, in secondary form, produces the desired correction of the output pressure.

It may also be the function of the control system of a compressor to regulate the total discharge or the delivered effective quantity of compressed gas to a constant value. The control loop described hereinbefore remains the same in these cases if due allowance is made for the different measured value and for the corresponding measuring unit of the discharge rate regulator.

If the consumption of compressed gas is low over a greater or lesser period of time, it is essential to avoid the unstable delivery state, so-called surging, in order to protect the compressor since the unstable state, if prolonged, may cause damage to the blades or bearings of the compressor. The minimum delivery rate required in each case to prevent the aforementioned hunting is normally adjusted by means of an anti-surging regulator. The delivery rate and the output pressure form a signal in the measuring unit of the anti-surging regulator, said signal being representative for the surging limit and being converted into an output signal which acts directly on to a blow-off valve.

The aforementioned regulating apparatus in conventional control systems are usually functionally separated so that in the event of reduced consumption, two separate controls act simultaneously, a feature which has a very detrimental effect on the stability or quality of control when anti-surging and pressure regulation is combined.

The prior art discloses different solutions to the problem of eliminating the difficulties of combined pressure and anti-surging control with respect to the dynamic characteristics of the system:

a. The association between the controllers and the final control elements is interchanged at the moment at which the action of the anti-surging control becomes necessary, when the blow-off valve is to be opened. This solution to the problem suffers from the disadvantage that the characteristic $p = f(\Delta p)$ of the anti-surging control system must first be reached and the blow-off valve must begin to open before the changeover takes place. This means that the blow-off valve opens as late as it would be in a conventional control system and no gain can therefore be expected over the stationary operating range, free of blow-off, by a reduction of the safety zone of the anti-surging system. Moreover, coupling of the control systems is not compensated but merely reduced.

b. Improvements to a limited extent can be achieved by the introduction of non-linearities into the control system. Concepts of this kind are concentrated in first place to achieving opening times and closing times for the discharge valves which are short and long respectively in the event of the anti-surging system coming into action and are also designed to enable the anti-surging system to come into action as early as possible, that is to say non-linearities which are to provide an adequate anti-surging control despite the necessarily low control gain. Most of the conventional embodiments are based on these solutions. For extreme requirements, for example, in the operation of steel works or blast furnaces, in which it is possible for extremely sudden disturbances to appear on the load side, these solutions do not provide any fully satisfactory results. The relatively low quality of control must be paid for above all with a very large safety zone for the anti-surging control and relatively large deviations of the output pressure from the set value.

The present invention is based on the fact that, in the same way as with practically all other control systems with two controlled conditions, only one of the couplings between the two controller outputs and the two controlled conditions must be regarded as truly detrimental for the control characteristics. As regards compressor control, this applies in the critical case to a sudden reduction of consumption (change of charge, changeover processes and the like), to the transmission between the pressure regulator output and the final control element for the discharge rate, because the pressure control reduces the quantity delivered by the compressor primarily and practically without delay and then reduces the output pressure to be controlled in a secondary phase - delayed by the time required to fill the delivery line. Accordingly, this effect is therefore far more detrimental to the anti-surging regulation system than the actual disturbance originating from the process and the action of which would also become effective, but only subject to the delay due to the filling period. Conversely however, the anti-surging regulation assists in pressure regulation by opening of the blow-off valve.

It is the object of the invention to compensate for the detrimental effect of the pressure regulator output on to the anti-surging regulating system.

The problem is solved by a de-coupling relay in which the output signal of the anti-surging regulator and the output signal of the delivery or discharge rate regulator are added and the output of which acts on the blow-off valve.

Apparatus which functions in this manner enables numerous advantages to be achieved: the stability conditions of the control system, that is to say the means for adjustment of the regulators is substantially improved, even with this one-sided de-coupling. Compressor regulation, known to be difficult to control in dynamic terms, becomes readily controllable. The output pressure of the compressor can be more accurately regulated and the compressor characteristic zone, free of blow-off, can be substantially expanded since the safety zone for anti-surging control can be reduced to a minimum. Surging can be avoided even in the presence of the most severe process disturbances. The additional cost is slight although a substantial improvement of the dynamic control characteristics are achieved.

One embodiment of the invention will be explained by reference to the accompanying diagrammatic drawing. The axial flow compressor 1, driven by the motor 2, draws in the gas through the suction duct 3 and delivers it into the delivery duct 4 on which the non-return valve 5 is disposed. The blow-off duct 6, kept closed by the blow-off valve 7, branches off upstream of the non-return valve 5 as seen in the flow direction.

The pressure measuring duct 8, branched at the position 9, communicates with the delivery duct 4. One branch extends to the pressure regulator 10 the other branch to the anti-surging regulator 11.

In the pressure regulator 10, the pressure of the measuring duct 8 acts on the bellows 12 which communicate through the linkage 13 with the oil discharge valve 14. The minumum pressure at which the valve 14 is to open can be adjusted with the spring 15 by means of the hand wheel 16. If the pressure in the measuring duct 8 exceeds the preselected minimum pressure, the valve 14 will open against the pull exerted by the spring 15 and allows control oil to be discharged from the delivery system 17, the feed 18 into said system being adjusted with the valve 19.

As soon as the oil pressure in the system 17 drops, the servomotor 20 will operate the diffuser blade adjusting system 21 in the closing sense. The delivery rate of the compressor will diminish and the pressure in the delivery line 4 will be reduced. If the pressure in the delivery line 4 and therefore in the pressure measuring duct 8 drops below the set value to which the pressure regulator 10 is adjusted, an analogous control process will take place but in the opposite sense. Any change of consumption in the process is therefore initially accompanied by changes of the compressor output pressure. The control system reacts to such changes primarily by changing the delivery rate which then in secondary form, produces the desired correction of the output pressure.

The anti-surging regulator 11 is provided with a differential pressure measuring system 22, the diaphragm 23 of which is biased by the pressures in the measuring ducts 24 and 25 of the flow metering position 26 in the suction duct 3. If the throughput rate and therefore the pressure difference at the measuring position 26 drops to a predefined minimum value, the force, directed upwardly in the drawing, and exerted by the diaphragm 23 will drop below the prestress of the spring 27 so that the linkage 28 of the oil discharge valve 29 is operated in the opening sense.

The oil discharge valve 29 is also opened if the pressure in the measuring duct 8 increases. The bellows 30 adjust the disc cam 31 to the left (in the drawing) as a function of said pressure thus causing the linkage 28 to open the oil discharge valve 29. Control oil, fed in at 33 via the valve 34 flows from the hydraulic oil system 32.

The previously described part of the control system is known and is used in such a way that the pressure in the system 32 acts as output signal of the anti-surging regulator on the blow-off valve 7; said valve opens when the pressure in the system 32 drops.

By contrast to this conventional system and in accordance with the invention, the input signal of the servomotor 35, which actuates the blow-off valve 7, is formed in the de-coupling relay 36 as the sum of two signals. One summand is the pressure in the system 32 and appears as the unchanged output signal of the anti-surging regulator 11; the other is the modified pressure in the system 17, functioning as the output signal of the pressure regulator 10.

The de-coupling relay 36 is provided with the housing 37 having the movable piston 38. The chamber on one side of the piston communicates with the hydraulic oil system 17, the chamber on the other side of the piston is limited by the spring-loaded accumulator piston 39. The two pressure chambers communicate with each other through the compensating duct 40, the flow through said duct being controlled by the adjustable valve 41.

The piston 42 is rigidly coupled to the piston 38 by means of a rod and is disposed in the same housing 37, one side of the said piston 42 being biased by the hydraulic oil system 32 and the other side by the hydraulic oil system 43. Hydraulic oil is fed to the system 43 at 44; the pressure is controlled by means of the inlet and discharge valve 46/47 which is rigidly coupled to the double piston 38/42.

When the system is at rest, the double piston 38/42 will be disposed in a defined middle position. If the pressure in the system 32 changes due to a control function, the double piston will move from its position of rest until — and as a consequence of the accompanying downward control of the hydraulic oil system 43 — a corresponding output pressure establishes itself in said hydraulic oil system. The de-coupling relay 36 therefore functions merely as a signal amplifier for transmitting the input pressure from the system 32 to the system 43.

In the event of a sudden change of pressure in the system 17 consequent to a control function, the double piston 38/42 will initially traverse from its position of rest until the output of the relay is subject to an amplified pressure change in the system 43 corresponding to the predefined area ratio of the pistons 38 and 42. The delayed pressure compensation on both sides of the piston 38 caused by the valve 41 results in the said effect decaying with a time constant. The value of the said time constant can be adjusted with the choke valve 41.

A sudden and severe reduction of the consumption of compressed gas may be assumed, starting from a steady-state operating point of the compressor. The output pressure in the delivery duct 4 will rise and cause the servomotor 20 to reduce the delivery rate by the pressure regulator 10, said delivery rate being now critical owing to the incipient danger of surging. At the same time, however, the output signal of the pressure regulator 10 is applied through the de-coupling relay 36 to the hydraulic oil system 43, thus causing substantial opening of the blow-off valve 7, even if the new operating point has not yet reached the steady-state characteristic $p = f(\Delta p)$ of the anti-surging regulating system. The pressure compensation within the relay 36, delayed by the choke valve 41, results in an immediate and gradual rise of the pressure in the system 43 and also causes the blow-off valve 7 to close so that the anti-hunting regulator can compensate for the opening of the blow-off valve, necessary under steady-state conditions, without any substantial overshoot when the anti-hunting characteristic is reached.

The apparatus according to the invention is equally suitable for use with axial flow and radial flow compressors and it can also be employed for discharge rate regulation and for combined discharge rate regulation and pressure limitation; electric or pneumatic control may also be provided in place of the hydraulic control.

I claim:

1. Apparatus for regulating a turbo-compressor comprising first regulator means responsive to the output pressure at the delivery side of the compressor which varies in accordance with the variation in the compressor delivery demand and which produces a first regulating signal, means actuated by said first signal for varying the rate of air flow through the compressor, an anti-surging regulator means responsive jointly to the air throughput rate of the compressor and the compressor output pressure for producing a second signal, a blow-off valve controlling air flow through a blow-off duct connected to the delivery duct from the compressor, a de-coupling relay receiving as joint inputs thereto said first and second signals and which includes means therein which add said first and second signals to produce a third signal, and means actuated by said third signal for actuating said blow-off valve.

2. Regulating apparatus as defined in claim 1 and wherein said de-coupling relay includes means by which said first signal admitted to it is cancelled with an adjustable time delay so that it does not participate with said second signal in forming said third signal when the regulating system is operating in a steady state mode.

3. Regulating apparatus as defined in claim 2 wherein said first and second signals are of the hydraulic type and wherein said de-coupling relay is constituted by a dual piston which actuates a valve controlling the pressure of hydraulic fluid applied to a servo motor which actuates said blow-off valve, the two pistons of said dual piston being subjected respectively to said first and second hydraulic signals, and there being an adjustable choke valve located in a compensation duct extending to opposite sides of the piston actuated by said first signal for producing said adjustable time delay.

* * * * *